Figure 1:
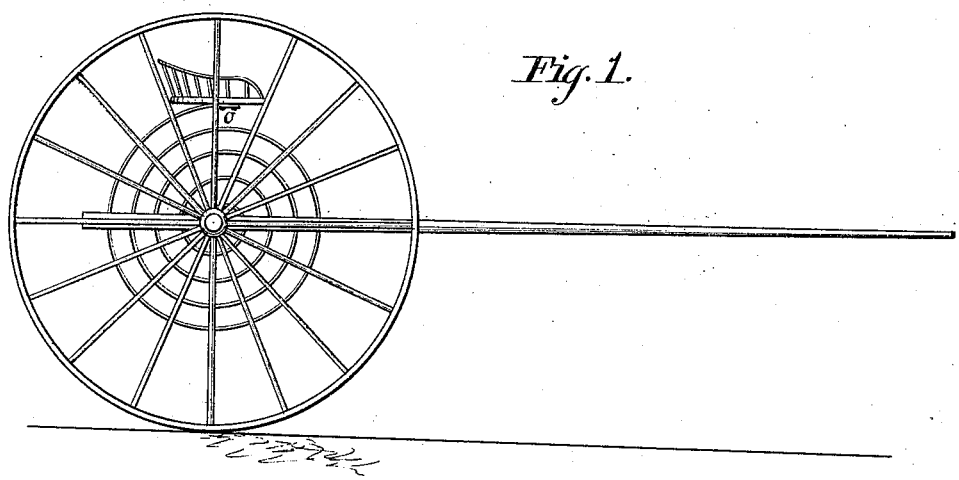

A. HITCHCOCK.
TROTTING VEHICLE.

No. 181,439. Patented Aug. 22, 1876.

Witnesses:

Inventor:
Alonzo Hitchcock

UNITED STATES PATENT OFFICE.

ALONZO HITCHCOCK, OF NEW YORK, N. Y.

IMPROVEMENT IN TROTTING-VEHICLES.

Specification forming part of Letters Patent No. 181,439, dated August 22, 1876; application filed February 2, 1876.

*To all whom it may concern:*

Be it known that I, ALONZO HITCHCOCK, of New York city, N. Y., have invented an Improved Vehicle, designed more especially for the race-course, of which the following is a specification:

The object of my invention is to construct a vehicle, especially for trotting-horses, in such a manner as to relieve the horse of the constant and deleterious jerks or surging caused by the weight of the sulky, and particularly by the weight of the man. This may be illustrated in the following manner: The ordinary way is to construct such vehicles with stiff rigid seats, when every step or spring of the horse produces a sudden jerk or thrust, unpleasant both to the driver and the horse; besides it undoubtedly retards the speed of the horse. In order to obviate this difficulty, elliptical springs have been used; but the construction and application of elliptic springs do not obviate the difficulty, and the action of such springs is probably detrimental. But if a coiled spring be used—such as is shown in the drawings A, Fig. 1—the sudden forward thrust or pull of the horse is all taken up in the long flexible spring, which may be several feet in length, before they reach the driver. It may be compared to a spring-board, fastened to the axle at one end, while the driver is sitting on the other end. Besides, this spring, when fastened to the center of the axle, takes off the lateral lurch or thrust by means of its torsion, which always occurs when one of the wheels of the sulky strikes an obstruction, or unevenness in the road, which is also a relief for the horse, as well as the rider. If desirable, two narrow coiled springs may be used in place of the one broad one, which will answer the same purpose.

Figure 2:
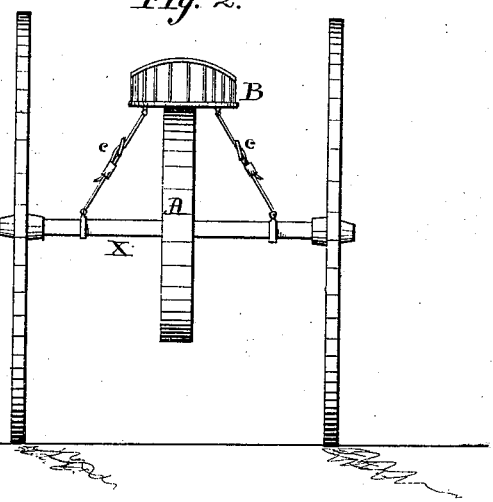

Figure 1 shows an elevation and side view of a trotting-sulky with a spiral spring, A, the inner end of which is fastened to the center of the axle X, while the seat B is fastened to the outside end of the spring A, on which the driver sits. Fig. 2 shows an end view of the same.

The spring B is to be made of sufficient strength to support the driver in the proper position, and, by preference, made of steel. The number of coils, width, and thickness of the springs, to carry out the principle, must be a matter of judgment in its construction and practical use, though a driver that weighs one hundred and fifty pounds would probably require a spring about one-sixteenth ($\frac{1}{16}$) of an inch thick, and about four inches wide, with about four coils. This spring would be better, perhaps, if the coil was made in the form of a polygon. The seat, by preference, will be pivoted on the end of the spring, as seen at O. $c\ c$ are straps or flexible braces, to steady the seat.

Figure 3:
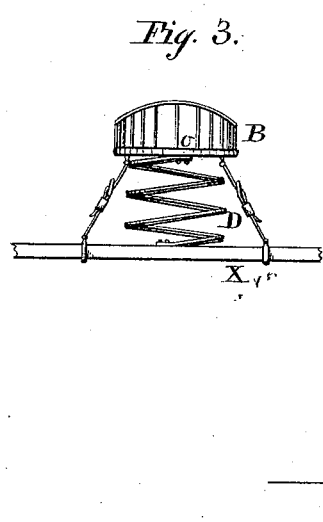

Fig. 3 shows another application of the coil or spiral spring, the center of its axis being perpendicular to that shown in Fig. 1.

I claim—

In a trotting-vehicle, a seat, B, freely supported upon a coiled spring or springs, substantially as described.

ALONZO HITCHCOCK.

Witnesses:
    HARLYN HITCHCOCK,
    B. S. CLARK.